United States Patent Office 2,773,912
Patented Dec. 11, 1956

2,773,912

PROCESS OF PREPARING 4-NITRO-PHENYLCYCLOHEXANE

Albert Bloom, Summit, and Dennis L. Deutsch, Cranford, N. J., assignors to General Aniline & Film Corporation, New York, N. Y., a corporation of Delaware No Drawing. Application February 10, 1954, Serial No. 409,516

5 Claims. (Cl. 260—645)

This invention relates to 4-nitrophenylcyclohexane and particularly to an improved process of preparing the same.

The nitration of phenylcyclohexane has been reported by several investigators. Kursanoff (Ann. 318, page 321, 1901) nitrated 1 mole of phenylcyclohexane with 18 moles nitric acid at a temperature of about 5–10° C. The crude nitration product was drowned in water, extracted with ether, the ether solution washed with water, aqueous sodium hydroxide solution, and finally with water. After drying the ether solution over sodium sulfate, the ether was removed by distillation. After distillation at 26 mm. pressure and 200–205° C., the 4-nitrophenylcyclohexane was collected and recrystallized from ethanol.

Subsequently, Boyd, Clifford and Robert (J. Chem. Soc. 117, 1389, 1920) followed the method of Kursanoff in their work and nitrated 1 mole of phenylcyclohexane with 6 moles of fuming nitric acid until the addition of acid caused no further visible change. After working up the crude reaction mixture in the usual manner and removing the ether by distillation, these investigators obtained a crude reaction product which, after cooling and crystallization from ethanol, yielded the final product.

Mayes & Turner (J. Chem. Soc. 691, 1928 and 502, 1929) thoroughly investigated the nitration of phenylcyclohexane and developed two additional nitration processes. In the first, 1 mole of phenylcyclohexane was slowly added to 14.5 moles of fuming nitric acid which was well stirred and cooled to 0° C. The agitation was continued for a short time after the addition was complete and the solution poured into ice. The semi-solid product was extracted with benzene and the benzene solution washed with water, alkali, water and finally dried over calcium chloride. After removal of the benzene by distillation, the residue was separated, by repeated distillation, into two fractions. The lower boiling fraction, 198° C. at 16 mm. contained the 4-nitrophenylcyclohexane while at 222° C. and 15 mm. the 2,4-dinitro phenylcyclohexane was obtained. In the second method, a saturated solution of 1 mole of phenylcyclohexane in glacial acetic acid was slowly added to a mixture of nitric acid (9 moles) in glacial acetic acid, the temperature being kept at 0° C. After the addition of the acid mixture was completed it was kept at 0° C. for about one-half hour, poured over ice and then worked up in the usual manner. Repeated fractional distillation gave two fractions, one boiling at 174° C. at 16 mm., which was then identified as the ortho isomer, i. e. 2-nitrophenylcyclohexane and the higher boiling fraction, 198° C. at 16 mm. yielded a product which corresponds to 4-nitrophenylcyclohexane.

The methods of Mayer & Turner were later modified by Neuhoffer (J. prakt. Chemie, (2), 133, 95, 1932), who treated a solution of 1 mole of phenylcyclohexane in glacial acetic acid with a mixture of acetic anhydride and fuming nitric acid (1 mole) and obtained a mixture of para- and ortho-nitrophenylcyclohexane in the ratio of 78:22.

All of the foregoing proceedings have several disadvantages. The first is that a very large excess of nitric acid, and the use of acetic acid or acetic anhydride as a solvent is required thereby increasing the cost of the process. The second is that the use of a mixture of nitric and acetic acids presents a possible industrial hazard and should not be employed for large scale production. The third is that fractionations at reduced pressures and fairly high temperatures are costly, time-consuming, and potentially hazardous with polynitro compounds.

We have discovered that the procedures of the prior art and their shortcomings can be very readily obviated and 4-nitrophenylcyclohexane obtained in a yield ranging between 50 and 54% of theory.

Accordingly, therefore, it is the object of the present invention to provide such a method. Other objects and advantages will appear from the following description.

We have found that phenylcyclohexane can be readily nitrated to 4-nitrophenylcyclohexane in a high production rate and short period of time by utilizing mixed nitric and sulfuric acid having a D. V. S. value of 3.2 to 4.7. By D. V. S., a recognized term, is meant the dehydrating value of sulfuric acid, which commercially in chemical plants is also referred to as spent-acid concentrations. It is expressed numerically by the quotient obtained by dividing the sulfuric acid content of the mixed acid by the total water present when nitration is completed.

The essential feature of our process is the employment of the mixed acid having the aforesaid values together with maintaining the nitration reaction at a temperature ranging between 0 and 5° C. for a period of time ranging between 1½ and 3 hours. After nitration the reaction mixture is poured into cold water, heated to 50° C. and the top aqueous layer separated from the oily layer. The crude oily layer is washed with warm water and again separated. The washing of the oily layer is continued until most of the mineral acidity is removed. From the crude nitration mixture the para isomer is readily separated by treating with either methanol or ethanol, n- or iso-propanol at a temperature between 0 and 5° C. The yield of the pure 4-nitrophenylcyclohexane ranges from 50–54% of theory.

The following example will clearly illustrate our improved process.

EXAMPLE

Into a 2 liter 4-neck flask, 318 grams phenylcyclohexane (2 moles) were placed and cooled to 0° C. In the course of 3 hours at 0–5° C. there was added 484 grams of a mixed acid (analysis 30% nitric acid, 60% sulfuric acid and 10% of water), containing 145.2 grams of nitric acid 100% (2.3 moles) and the mixture kept at 0–5° C. for 2 hours. After this time, the nitration was completed and the reaction mixture poured into 1000 cc. of cold water and warmed to 50° C. so as to separate the top aqueous layer from the oily layer. The crude oily layer was washed with warm water and separated. The washing was continued with warm water for several times until most of the mineral acidity was removed. The weight of the crude oil, which amounted to 363–368 grams, equals 88.6–90% of theory of crude isomeric nitrophenylcyclohexane.

From the foregoing mixture the para isomer, i. e. 4-nitrophenylcyclohexane, was separated by placing the mixture into a 2 liter 3-neck flask, adding 500 cc. of ethanol and cooling to 0–5° C. The ethanol mixture was kept at 0–5° C. for one hour and filtered cold. The filter cake was washed with 100 cc. of cold ethanol (0–5° C.), and then dried in vacuum. The yield of the pure 4-nitrophenylcyclohexane amounted to 203.8–224.5 grams or 50–55.0% of theory.

The economics of any chemical process is a function of the cost of raw materials and the operating costs for each of the time cycles involved in the process. From the following table it is readily seen that when 1.15 moles of nitric acid (as mixed acid) is used to nitrate 1 mol of phenylcyclohexane, a D. V. S. value of 3.23 to 4.69 gives a higher yield of the p-isomer in a shorter period of time. At a lower D. V. S., such as, for example 2.41, a much longer period of time, 20 hours, is required to obtain a yield of the same order of magnitude. When the D. V. S. is higher, i. e., ranging from 7.1 to 18.1, sulfonation occurs and very little of the desired product is obtained.

Table 1 mole phenylcyclohexane.
1.15 moles nitric acid as 100%.
Temperature: 0-5° C.

| Example | Mixed acid | | D.V.S. calc. | Reaction time, hours | Degree of nitration[1] calc. on M.W. 204 | Isolated yield of p-isomer, percent of th. |
|---|---|---|---|---|---|---|
| | HNO₃ | H₂SO₄ | | | | |
| 1 | 33 | 48 | 1.68 | 25 | 65.8 | 14.1 |
| 2 | 28 | 56 | 2.33 | 8 | 80.0 | 30.2 |
| 3 | 28 | 56 | 2.33 | 23 | 83.2 | 41.4 |
| 4 | 43 | 49 | 2.41 | 20 | 94.3 | 50.0 |
| 5 | 30 | 60 | 3.23 | 2 | 98.1 | 55.0 |
| 6 | 30 | 60 | 3.23 | 4 | 96.0 | 53.2 |
| 7 | 23.5 | 68.5 | 4.69 | 2 | 100.0 | 48.0 |
| 8 | 33 | 67 | 7.10 | 9 | (²) | (²) |
| 9 | 16 | 82.5 | 9.15 | 4 | (²) | (²) |
| 10 | 17 | 83 | 18.10 | 4 | (²) | (²) |

[1] This was determined by analyzing a reaction sample, after reduction, by titrating with sodium nitrite.
[2] Sulfonation occurs.

We claim:

1. A process for preparing 4-nitrophenylcyclohexane which comprises nitrating phenylcyclohexane with a sulfuric acid-nitric acid mixture having a D. V. S. value between 3.2 and 4.7 at a temperature of 0-5° C., separating the crude nitrated mixture, washing the oily layer with water to remove the mineral acidity, and thereafter purifying the mixture by treatment with a lower alkyl alcohol at a temperature of 0-5° C. for a period of time sufficient to yield the 4-nitrophenylcyclohexane which is isolated and washed with a lower alkyl alcohol and dried.

2. The process according to claim 1 wherein the lower alkyl alcohol is methanol.

3. The process according to claim 1 wherein the lower alkyl alcohol is ethanol.

4. The process according to claim 1 wherein the lower alkyl alcohol is n-propanol.

5. The process according to claim 1 wherein the lower alkyl alcohol is iso-propanol.

References Cited in the file of this patent

UNITED STATES PATENTS

| 1,309,559 | Woodbury | July 8, 1919 |
| 1,891,543 | Huntress et al. | Dec. 20, 1932 |
| 2,252,099 | Rosen | Aug. 12, 1941 |

OTHER REFERENCES

Beilstein: "Organische Chemie," Band 5 (Cychsche Kohlenwasserstaff), published by Kerlag Van Julius Springer (Berlin), 1922 (p. 504 relied on). (Copy in Div. 6.)

Mayes et al.: (J. Chem. Soc.), 500 (1929) (pp. 500–504 relied on). (Copy in the Scientific Library.)

Mayes et al.: (J. Chem. Soc.), 502 (1929) (London). (Copy in Sci. Library.)